US008560706B2

(12) United States Patent
Appelman

(10) Patent No.: US 8,560,706 B2
(45) Date of Patent: *Oct. 15, 2013

(54) DEGREES OF SEPARATION FOR HANDLING COMMUNICATIONS

(75) Inventor: Barry Appelman, McLean, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,583

(22) Filed: May 16, 2012

(65) Prior Publication Data

US 2012/0317212 A1  Dec. 13, 2012

Related U.S. Application Data

(63) Continuation of application No. 13/093,147, filed on Apr. 25, 2011, now Pat. No. 8,185,638, which is a continuation of application No. 10/746,230, filed on Dec. 29, 2003, now Pat. No. 7,945,674.

(60) Provisional application No. 60/459,272, filed on Apr. 2, 2003.

(51) Int. Cl.
*G06F 15/16* (2006.01)

(52) U.S. Cl.
USPC ............ 709/227; 709/206; 709/228; 709/229

(58) Field of Classification Search
USPC .......................................... 709/206, 227–229
See application file for complete search history.

(56) References Cited

U.S. PATENT DOCUMENTS

| 4,837,798 | A | 6/1989 | Cohen et al. |
| 5,086,394 | A | 2/1992 | Shapira |
| 5,276,905 | A | 1/1994 | Hurst et al. |
| 5,327,486 | A | 7/1994 | Wolff et al. |
| 5,548,637 | A | 8/1996 | Heller |
| 5,553,110 | A | 9/1996 | Sentoku et al. |

(Continued)

FOREIGN PATENT DOCUMENTS

| EP | 0 862 304 | 9/1998 |
| EP | 1 176 840 | 1/2002 |

(Continued)

OTHER PUBLICATIONS

"AOL Instant Messenger All New Version 2.0," Jun. 24, 1999, 2 pages.

(Continued)

*Primary Examiner* — Mohamed A Wasel
(74) *Attorney, Agent, or Firm* — Keller Jolley Preece

(57) ABSTRACT

A sender's degrees of separation from a recipient may be used to aid in spam filtering or to otherwise handle a communication. The "degrees of separation" represent a metric used to quantify whether/how the recipient is linked to the sender through intermediary people or other entities. For example, a recipient may know a first user (first degree of separation) and the first user may know a second user (second degree of separation) who knows the sender of an e-mail. In this case, the sender is separated from the recipient by two degrees of separation (by two other contact). A level of "trust" or "legitimacy" about a sender's communication can be inferred by looking at whether the sender is linked to an intended recipient. Typically, user contact lists are evaluated to determine the number of degrees (or hops) are required to link or relate two users.

20 Claims, 6 Drawing Sheets

(56) References Cited

U.S. PATENT DOCUMENTS

| | | |
|---|---|---|
| 5,557,659 A | 9/1996 | Hyde-Thomson |
| 5,608,786 A | 3/1997 | Gordon |
| 5,694,616 A | 12/1997 | Johnson |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang |
| 5,802,470 A | 9/1998 | Gaulke |
| 5,850,594 A | 12/1998 | Cannon et al. |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,920,692 A | 7/1999 | Nguyen et al. |
| 5,940,488 A | 8/1999 | DeGrazia |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,987,113 A | 11/1999 | James |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber |
| 6,112,181 A | 8/2000 | Shear et al. |
| 6,134,432 A | 10/2000 | Holmes et al. |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,199,103 B1 | 3/2001 | Sakaguchi et al. |
| 6,212,550 B1 | 4/2001 | Segur |
| 6,247,043 B1 | 6/2001 | Bates et al. |
| 6,249,740 B1 | 6/2001 | Ito et al. |
| 6,260,148 B1 | 7/2001 | Aggarwal et al. |
| 6,269,369 B1 * | 7/2001 | Robertson ............. 1/1 |
| 6,301,609 B1 | 10/2001 | Aravamudan et al. |
| 6,311,211 B1 | 10/2001 | Shaw |
| 6,314,450 B1 | 11/2001 | Hachiya et al. |
| 6,324,541 B1 | 11/2001 | de l'Etraz |
| 6,330,590 B1 | 12/2001 | Cotten |
| 6,347,332 B1 | 2/2002 | Malet |
| 6,349,327 B1 | 2/2002 | Tang et al. |
| 6,351,698 B1 | 2/2002 | Kubota et al. |
| 6,363,392 B1 | 3/2002 | Halstead et al. |
| 6,366,962 B1 | 4/2002 | Teibel |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,415,318 B1 | 7/2002 | Aggarwal |
| 6,421,439 B1 | 7/2002 | Liffick |
| 6,421,675 B1 | 7/2002 | Ryan |
| 6,421,709 B1 | 7/2002 | McCormick et al. |
| 6,425,012 B1 | 7/2002 | Trovato et al. |
| 6,430,604 B1 | 8/2002 | Ogle |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,542,750 B2 | 4/2003 | Hendrey et al. |
| 6,549,937 B1 | 4/2003 | Auerbach |
| 6,557,027 B1 | 4/2003 | Cragun |
| 6,559,863 B1 | 5/2003 | Megiddo |
| 6,564,261 B1 | 5/2003 | Gudjonsson et al. |
| 6,571,234 B1 | 5/2003 | Knight |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,218 B1 | 10/2003 | Golding |
| 6,640,230 B1 | 10/2003 | Alexander et al. |
| 6,647,383 B1 | 11/2003 | August |
| 6,654,683 B2 | 11/2003 | Jin et al. |
| 6,677,968 B1 | 1/2004 | Appelman |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang |
| 6,732,155 B2 | 5/2004 | Meek |
| 6,750,881 B1 | 6/2004 | Appelman |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,799,039 B2 | 9/2004 | Wu et al. |
| 6,800,031 B2 | 10/2004 | Di Cesare |
| 6,816,578 B1 | 11/2004 | Kredo et al. |
| 6,832,245 B1 | 12/2004 | Isaacs et al. |
| 6,839,737 B1 | 1/2005 | Friskel |
| 6,901,559 B1 | 5/2005 | Blum |
| 6,904,026 B1 | 6/2005 | Tarnanen et al. |
| 6,907,243 B1 | 6/2005 | Patel |
| 6,912,563 B1 | 6/2005 | Parker |
| 6,912,564 B1 | 6/2005 | Appelman et al. |
| 6,917,965 B2 | 7/2005 | Gupta |
| 6,941,345 B1 | 9/2005 | Kapil et al. |
| 6,968,179 B1 | 11/2005 | De Vries |
| 6,990,513 B2 | 1/2006 | Belfiore et al. |
| 6,993,327 B2 | 1/2006 | Mathis |
| 6,993,564 B2 | 1/2006 | Whitten, II |
| 7,035,865 B2 | 4/2006 | Doss et al. |
| 7,039,639 B2 | 5/2006 | Brezin et al. |
| 7,058,036 B1 | 6/2006 | Yu et al. |
| 7,058,690 B2 | 6/2006 | Maehiro |
| 7,082,047 B2 | 7/2006 | Chow |
| 7,117,254 B2 * | 10/2006 | Lunt et al. ............. 709/218 |
| 7,124,123 B1 | 10/2006 | Roskind et al. |
| 7,127,232 B2 | 10/2006 | O'Neil et al. |
| 7,177,880 B2 | 2/2007 | Ruvolo |
| 7,181,498 B2 * | 2/2007 | Zhu et al. ............. 709/206 |
| 7,185,059 B2 | 2/2007 | Daniell et al. |
| 7,188,153 B2 * | 3/2007 | Lunt et al. ............. 709/218 |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,263,614 B2 | 8/2007 | Roskind |
| 7,269,590 B2 * | 9/2007 | Hull et al. ............. 707/770 |
| 7,275,215 B2 | 9/2007 | Werndorfer |
| 7,283,805 B2 | 10/2007 | Agrawal |
| 7,313,760 B2 | 12/2007 | Grossman |
| 7,316,028 B2 | 1/2008 | Donatelli et al. |
| 7,436,780 B2 | 10/2008 | Stephens et al. |
| 7,490,238 B2 | 2/2009 | Roskind |
| 7,945,674 B2 | 5/2011 | Appelman |
| 7,949,759 B2 | 5/2011 | Appelman |
| 7,954,146 B2 | 5/2011 | Roskind |

(56) References Cited

U.S. PATENT DOCUMENTS

| | | | |
|---|---|---|---|
| 8,060,566 B2* | 11/2011 | Appleman | 709/206 |
| 8,185,638 B2 | 5/2012 | Appelman | |
| 2001/0005861 A1 | 6/2001 | Mousseau | |
| 2001/0013050 A1 | 8/2001 | Shah | |
| 2002/0015061 A1 | 2/2002 | Maguire | |
| 2002/0021307 A1 | 2/2002 | Glenn et al. | |
| 2002/0023132 A1 | 2/2002 | Tornabene et al. | |
| 2002/0023134 A1 | 2/2002 | Roskowski et al. | |
| 2002/0028595 A1 | 3/2002 | Higashi et al. | |
| 2002/0042816 A1 | 4/2002 | Bae | |
| 2002/0055975 A1 | 5/2002 | Petrovykh | |
| 2002/0059201 A1 | 5/2002 | Work | |
| 2002/0065856 A1 | 5/2002 | Kisiel | |
| 2002/0065894 A1 | 5/2002 | Dalal et al. | |
| 2002/0077080 A1 | 6/2002 | Greene | |
| 2002/0083136 A1 | 6/2002 | Whitten, II | |
| 2002/0086732 A1 | 7/2002 | Kirmse et al. | |
| 2002/0091667 A1 | 7/2002 | Jaipuria et al. | |
| 2002/0103801 A1 | 8/2002 | Lysons | |
| 2002/0112181 A1 | 8/2002 | Smith | |
| 2002/0116463 A1 | 8/2002 | Hart | |
| 2002/0116641 A1 | 8/2002 | Mastrianni | |
| 2002/0133292 A1 | 9/2002 | Miyaki | |
| 2002/0133369 A1 | 9/2002 | Johnson | |
| 2002/0147777 A1 | 10/2002 | Hackbarth et al. | |
| 2002/0174010 A1 | 11/2002 | Rice, III | |
| 2002/0175953 A1 | 11/2002 | Lin | |
| 2002/0178161 A1 | 11/2002 | Brezin et al. | |
| 2002/0181703 A1 | 12/2002 | Logan et al. | |
| 2002/0184089 A1 | 12/2002 | Tsou et al. | |
| 2002/0193942 A1 | 12/2002 | Odakura et al. | |
| 2002/0199095 A1 | 12/2002 | Bandini et al. | |
| 2003/0004855 A1 | 1/2003 | Dutta | |
| 2003/0004872 A1 | 1/2003 | Gardi | |
| 2003/0009523 A1 | 1/2003 | Lindskog et al. | |
| 2003/0018726 A1 | 1/2003 | Low et al. | |
| 2003/0023875 A1 | 1/2003 | Hursey | |
| 2003/0028524 A1 | 2/2003 | Keskar | |
| 2003/0028595 A1 | 2/2003 | Vogt et al. | |
| 2003/0037112 A1 | 2/2003 | Fitzpatrick | |
| 2003/0043201 A1 | 3/2003 | Abdelhadi et al. | |
| 2003/0046198 A1 | 3/2003 | Knapp et al. | |
| 2003/0050916 A1 | 3/2003 | Ortega | |
| 2003/0055831 A1 | 3/2003 | Ryan | |
| 2003/0065721 A1* | 4/2003 | Roskind | 709/204 |
| 2003/0084103 A1 | 5/2003 | Weiner et al. | |
| 2003/0088554 A1 | 5/2003 | Ryan | |
| 2003/0093580 A1 | 5/2003 | Thomas et al. | |
| 2003/0101226 A1 | 5/2003 | Quine | |
| 2003/0105822 A1 | 6/2003 | Gusler | |
| 2003/0131061 A1 | 7/2003 | Newton | |
| 2003/0140103 A1 | 7/2003 | Szeto et al. | |
| 2003/0167324 A1 | 9/2003 | Farnham et al. | |
| 2003/0172349 A1 | 9/2003 | Katayama | |
| 2003/0182394 A1 | 9/2003 | Ryngler et al. | |
| 2003/0187813 A1 | 10/2003 | Goldman et al. | |
| 2003/0233416 A1 | 12/2003 | Beyda | |
| 2004/0015548 A1 | 1/2004 | Lee | |
| 2004/0054729 A1 | 3/2004 | Fukuizumi et al. | |
| 2004/0054736 A1 | 3/2004 | Daniell et al. | |
| 2004/0056901 A1 | 3/2004 | March | |
| 2004/0117443 A1 | 6/2004 | Barsness | |
| 2004/0122681 A1 | 6/2004 | Ruvolo | |
| 2004/0122810 A1 | 6/2004 | Mayer | |
| 2004/0122855 A1 | 6/2004 | Ruvolo | |
| 2004/0128356 A1 | 7/2004 | Bernstein et al. | |
| 2004/0179039 A1 | 9/2004 | Blattner et al. | |
| 2004/0186738 A1 | 9/2004 | Reisman | |
| 2004/0201624 A1 | 10/2004 | Crawford | |
| 2004/0210844 A1 | 10/2004 | Pettinati et al. | |
| 2004/0215648 A1 | 10/2004 | Marshall | |
| 2004/0215721 A1 | 10/2004 | Szeto | |
| 2004/0215793 A1* | 10/2004 | Ryan et al. | 709/229 |
| 2004/0221309 A1 | 11/2004 | Zaner | |
| 2004/0260762 A1 | 12/2004 | Fish | |
| 2005/0015432 A1* | 1/2005 | Cohen | 709/201 |
| 2005/0021750 A1 | 1/2005 | Abrams | |
| 2005/0027382 A1 | 2/2005 | Kirmse | |
| 2005/0038688 A1 | 2/2005 | Collins et al. | |
| 2005/0038856 A1 | 2/2005 | Krishnasamy et al. | |
| 2005/0043989 A1 | 2/2005 | Shifrin | |
| 2005/0044152 A1 | 2/2005 | Hardy et al. | |
| 2005/0050143 A1 | 3/2005 | Guster | |
| 2005/0055416 A1 | 3/2005 | Heikes et al. | |
| 2005/0060377 A1 | 3/2005 | Lo et al. | |
| 2005/0076240 A1 | 4/2005 | Appleman | |
| 2005/0076241 A1 | 4/2005 | Appelman | |
| 2005/0080859 A1 | 4/2005 | Lake | |
| 2005/0080863 A1 | 4/2005 | Daniell | |
| 2005/0086211 A1 | 4/2005 | Mayer | |
| 2005/0091311 A1 | 4/2005 | Lund et al. | |
| 2005/0114229 A1 | 5/2005 | Ackley et al. | |
| 2005/0153681 A1 | 7/2005 | Hanson | |
| 2005/0154913 A1* | 7/2005 | Barriga et al. | 713/201 |
| 2005/0171799 A1 | 8/2005 | Hull et al. | |
| 2005/0177486 A1 | 8/2005 | Yeager | |
| 2005/0197846 A1 | 9/2005 | Pezaris | |
| 2005/0198131 A1 | 9/2005 | Appelman | |
| 2005/0198172 A1 | 9/2005 | Appelman | |
| 2005/0198268 A1 | 9/2005 | Chandra | |
| 2005/0216300 A1* | 9/2005 | Appelman et al. | 705/1 |
| 2005/0246420 A1* | 11/2005 | Little, II | 709/204 |
| 2006/0031772 A1 | 2/2006 | Valeski | |
| 2006/0075044 A1 | 4/2006 | Fox et al. | |
| 2006/0129678 A1 | 6/2006 | Morita | |
| 2006/0167991 A1 | 7/2006 | Heikes et al. | |
| 2006/0168054 A1 | 7/2006 | Burkhart et al. | |
| 2006/0173824 A1 | 8/2006 | Bensky et al. | |
| 2006/0173963 A1 | 8/2006 | Roseway et al. | |
| 2006/0182248 A1 | 8/2006 | Smith et al. | |
| 2006/0190536 A1* | 8/2006 | Strong et al. | 709/204 |
| 2006/0212561 A1 | 9/2006 | Feng | |
| 2006/0248573 A1 | 11/2006 | Pannu et al. | |
| 2006/0277187 A1 | 12/2006 | Roese et al. | |
| 2007/0156664 A1 | 7/2007 | Norton et al. | |
| 2007/0250566 A1 | 10/2007 | Appleman | |
| 2008/0228598 A1 | 9/2008 | Leff et al. | |
| 2008/0255989 A1* | 10/2008 | Altberg et al. | 705/40 |
| 2009/0043844 A1* | 2/2009 | Zimmet et al. | 709/204 |
| 2009/0070306 A1 | 3/2009 | Stroe | |
| 2009/0089316 A1 | 4/2009 | Kogan et al. | |

FOREIGN PATENT DOCUMENTS

| | | |
|---|---|---|
| GB | 2357932 | 7/2001 |
| GB | 2368747 | 5/2002 |
| JP | 2000-259514 | 9/2000 |
| JP | 2000-284999 | 10/2000 |
| JP | 2001-084321 | 3/2001 |
| WO | WO 97/10558 | 3/1997 |
| WO | WO 97/46955 | 12/1997 |
| WO | WO 98/16045 | 4/1998 |
| WO | WO 99/08434 | 2/1999 |
| WO | WO 00/79396 | 12/2000 |
| WO | WO 01/22258 | 3/2001 |
| WO | WO 01/67787 | 9/2001 |
| WO | WO 02/03216 | 1/2002 |
| WO | WO 02/073886 | 9/2002 |
| WO | WO 01/06748 | 1/2004 |
| WO | WO 2005/086723 | 9/2005 |
| WO | WO 2005/089286 | 9/2005 |
| WO | WO 2006/068955 | 6/2006 |

OTHER PUBLICATIONS

"Frequently Asked Questions About AOL Instant Messenger," Jun. 24, 1999, 6 pages.

"New Features in AOL Instant Messenger for Windows v. 2.01 Beta," Apr. 28, 1999, 2 pages.

"Quick Tips for Getting Started," Jun. 24, 1999, 5 pages.

"Using Active Directory Service," from Chapter 5, Microsoft Windows 2000 Administrator's Pocket Consultant, by William R. Stank (1999). pp. 1-6.

(56) References Cited

OTHER PUBLICATIONS

"What is AOL Instant Messenger," Jun. 24, 1999, 3 pages.
"Windows 2000 Directory Services," [online] http://www.microsoft.com/windows2000/technologies/directory/default.asp, Nov. 25, 2001, 1 page.
Stank, William R., "Working with Active Directory Domains," from Chapter 5, Microsoft Windows 2000 Administrator's Pocket Consultant, (1999). pp. 1-10.
Office Action, U.S. Appl. No. 11/150,180, mailed Oct. 2, 2007, 22 pages.
Office Action, U.S. Appl. No. 09/843,788, mailed Apr. 19, 2007, 17 pages.
McKendrick, Joseph, "Internet Call Centers: New Era in Customer Service," Feb. 2002, vol. 10, 5 pages.
"Introducing the Gordano Messaging Suite," http://www.gordano.com, Copyright 1994-2003, Gordano, 3 pages.
"The LP Wireless Messenger," Messenger Documentation, [online]. LP Wireless, Inc., 2002, retrieved on Nov. 2, 2002 from http://www.lpwireless.com/messengerhelp.htm pp. 1-7.
"AOL technology: turning complicated things into engaging services," 1996 Annual Report, 22 pages.
"YAHOO! Messenger Makes the World a Little Smaller, More informed," Jun. 21, 1999, pp. 1-2.
Alan Cohen, "Instant Messaging," PC Magazine, PC Labs, Apr. 13, 1999, 2 pages.
"What's new about exchanging information over the Internet," Outlook 2000 SR-1 (9.0.0.4527), 1 page.
"About Internet directory services," Outlook 2000 SR-1 (9.0.0.4527) Help File, on or before Aug. 10, 2001, p. 1.
"Set up LDAP directory services," Outlook 2000 SR-1 (9.0.0 4527) Help File, on or before Aug. 10, 2001, p. 1.
"Look up contact information from an item," Outlook 2000 SR-1 (9.0.0 4527) Help File, on or before Aug. 10, 2001, p. 1.
J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal.asp?frame=true>, pp. 1-18.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame=true>, pp. 1-9.
Microsoft Corporation, "Comparing Microsoft Active Directory to Novell's NDS," [online], Sep. 1998 [retrieved on May 13, 2003]. Retrieved from the Internet <http://msdn.microsoft.com/library/en-us/dnactdir/html/msdn_activedirvsnds.asp?frame=true>, pp. 1-17.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_adsiexch.asp?frame=true>, pp. 1-12.
"Active Directory Service Overview," [online], Nov. 30, 2001 [retrieved on May 13, 2003]. Retrieved from the Internet <http://www.microsoft.com/windows2000/server/evaluation/business/addatasheet.asp>, pp. 1-5.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.
"Active Directory," [online], [retrieved on May 13, 2003]. Retrieved from the Internet http://www.microsoft.com/windows2000/technologies/directory/AD/default.asp, pp. 1-13.
Microsoft Corporation, "Introduction to Active Directory Application Mode," Microsoft Windows Server 2003, Aug. 2002, pp. 1-13.
"Active Directory Features," [online], Jun. 15, 1999 [retrieved on May 13, 2003]. Retrieved from the Internet http://www.microsoft.com/windows2000/server/evaluation/features/adlist.asp, pp. 1-4.
"Directory Integration Can Lower Total Cost of Ownership and Increase Application Functionality," [online], Jul. 27, 1998, [retrieved on May 13, 2003]. Retrieved from the Internet http://www.microsoft.com/presspas/press/1998/July98/ActivDPR.asp, pp. 1-4.
"Enterprise Identity Management with Windows 2000 and Active Directory," [online], 1999 [retrieved on May 13, 2003]. Retrieved from the Internet http://www.microsoft.com/technet/prodtechnol/ad/windows2000/evaluate/w2keims.asp?fra . . . , pp. 1-16.
"Integrating Applications with Windows 2000 and Active Directory," [online], Oct. 2000 [retrieved on May 8, 2003]. Retrieved from the Internet <http://www.microsoft.com/technet/prodtechnol/ad/windows2000/evaluate/adappstr.asp?fra . . . >, pp. 1-12.
Part I: Active Directory Operations, Active Directory Operations Guide, Microsoft Corporation, Microsoft Windows 2000, Version 1.5, Published Dec. 5, 2002, pp. 1-187.
"Part II: Tasks and Procedures," Active Directory Operations Guide, Microsoft Corporation, Microsoft Windows 2000, Version 1.5, Published Dec. 5, 2002, pp. 1-131.
Kohda et al., IMPP: A New Instant Messaging Standard and Its Impact on Internet Business, Dec. 2000, Fujitsu Sci. Tech. J., 36, 2, pp. 147-153.
International Search Report for International Application No. PCT/US03/15715, mailed Aug. 14, 2003, 6 pages.
"A Reputation System for Peer-to-Peer Networks," Gupta et al., Jun. 1-3, 2003, NOSSDAV'03, Monterey, California, pp. 144-152.
"BestCalls.com Announces the BestCalis Technology Index," Business Wire, Jun. 30, 1999, Business Wire, 2 pages.
"Business at Cyberspeed; Brainstorm Becomes Quick Internet Hit," Walker, Jan. 24, 1999, The Washington Post, p. A.01 4 pages.
"CrushParty.com: Help," retrieved Jun. 12, 2002 from the World Wide Web: http://www.crushparty.com/help.jsp, 3 pages.
"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages.
"Finding Others Online: Reputation Systems for Social Online Spaces," Jensen et al., Apr. 20-25, 2002, CHI, Minneapolis, Minnesota, vol. 4, Issue 1, pp. 447-454.
"Hottie or Nottie? Web Site Voters Let You Know Whether You Sizzle or Fizzle," Marino, Jul. 11, 2001, Florida Times Union, p. C.1. (2 total pages).
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=1 07029 . . . , printed on Nov. 5, 2004, 2 pages.
"Instant Messaging for Gamers," PC Gamer, May 2004, vol. 11, No. 5, 2 pages.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anlx.net/piespy printed on Mar. 11, 2004, 18 pages.
"plaxo," Plaxo, reprinted from http://web.archive.org/web/200411 05072256/http://www.plaxo.com/ printed on Nov. 5, 2004 (available on Feb. 14, 2004), 2 pages.
"Plaxo—Update Your Address Book," Plaxo Contact Networks, reprinted from http://web.archive.org/web/20030218233638/http://www.plaxo.com/ printed on Nov. 5, 2004, available on Feb. 18, 2003, 1 page.
"Reflections on Friendster, Trust and Intimacy," Danah Boyd. *Ubicomp* 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.

(56) References Cited

OTHER PUBLICATIONS

"RIM Road: Software: Internet & Network; Webmessenger RIM J2ME/Instant Messaging," retrieved Apr. 29, 2004 from the World Wide Web: http://www.rimrod.com/software/rim1/Webmessenger-RIM-J2ME/Instant-Messaging-20 . . . , pp. 1-4.
"Six Degrees—New Programs Help Companies 'Mine Workers' Relationships for Key Business Prospects," William M. Bulkeley et al., Marketplace, The Wall Street Journal, Aug. 4, 2003, 3 pages.
"Social Network Fragments: An Interactive Tool for Exploring Digital Social Connections." Danah Boyd, Jeff Potter. Sketch at S/GGRAPH 2003. San Diego, California: ACM, Jul. 27-31, 2003, 1 page.
"Social Networking for Business: Release 0.5," Esther Dyson, Esther Dyson's Monthly Report, vol. 21, No. 1 0, Nov. 25, 2003, www. edventure.com, 36 pages.
"Social Sites Clicking With Investors," Washingtonpost.com: Social Sites Clicking With Investors, reprinted from http://www. washingtonpost.com/ac2/wp-dyn/A32066-2003Nov12?language=printer printed on Nov. 5, 2004, 2 pages.
"Social Social Networks: Deodorant for the Soul?," Esther Dyson, Esther Dyson's Monthly Report, vol. 21, No. 11, Dec. 12, 2003, www.edventure.com, 36 pages.
"Spoke Builds on Social Networking Patent Portfolio," Spoke Builds on Social Networking Patent Portfolio, reprinted from http://www. internetnews.com/ent-news/print.php/3073621 printed on Nov. 5, 2004, 3 pages.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, 4 pages.
"Technology Journal: Changing Chat—Instant Messaging is Taking Off, and for Some Users It's Nuzzling Out the Phone," Nick Wingfield, Asian WSJ, Sep. 2000, 5 pages.
"The first Social Software . . . a true Social Adventure," Huminity-Social Networking, Chat Software, Create Personal Free Blogs and My Group . . . , reprinted from http://www.huminity.com/ printed on Nov. 5, 2004, 2 pages.
"Trillian Discussion Forums—Howto: Import ICQ 2003a Contact List," retrieved Apr. 29, 2004 from the World Wide Web: http:/trillion. cc/forums/showthread.php?s+&threaded=36475, pp. 1-2.
"Welcome to Huminity World of Connections," Huminity-Home, reprinted from http://web.archive.org/web/20030228131435/www. huminity.com/default.php?internationa . . . printed on Nov. 5, 2004 (available on Feb. 2, 2003), 1 page.
America Online Inc., "AOL Instant Messenger", Aug. 29, 2000, Internet: www.aol.com/aim/, 18 pages.
America Online Inc., New AIM 4.7, Sep. 27, 2001, Internet: http://aim.aol.com 7 pages.
CNET Networks Inc., "PopUp Killer", Sep. 13, 2001, Internet: download .cnet.com/downloads/0-10059-100-6932612.html, 3 pages.
International Search Report and Written Opinion dated Feb. 15, 2006 for International Application No. PCT/US05/07204, 9 pages.
International Search Report and Written Opinion issued in International Application No. PCT/US05/45663, dated Apr. 11, 2008, 7 pages.
International Search Report issued in Application Serial No. PCT/US05/08476, dated Oct. 16, 2006, 9 pages.
International Search Report issued in International Application No. EP03731244, dated Aug. 30, 2005, 4 pages.
Office Action issued in U.S. Appl. No. 10/146,814, dated Jul. 2, 2007, 15 pages.
Office Action issued in U.S. Appl. No. 10/146,814, dated Dec. 11, 2006, 15 pages.
Office Action issued in U.S. Appl. No. 10/184,002, dated Jan. 9, 2007, 11 pages.
Office Action issued in U.S. Appl. No. 10/334,056, dated Oct. 30, 2008, 19 pages.
Office Action issued in U.S. Appl. No. 10/334,056, dated May 12, 2008, 22 pages.
Office Action issued in U.S. Appl. No. 10/334,056, dated Nov. 5, 2007, 21 pages.
Office Action issued in U.S. Appl. No. 10/334,056, dated May 21, 2007, 7 pages.
Office Action issued in U.S. Appl. No. 10/334,056, dated May 10, 2006, 7 pages.
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/633,636, dated Oct. 11, 2006, 9 pages.
Office Action issued in U.S. Appl. No. 10/746,232, dated Mar. 18, 2009, 26 pages.
Office Action issued in U.S. Appl. No. 10/981,460, dated Aug. 20, 2008, 24 pages.
Office Action issued in U.S. Appl. No. 11/015,423, dated Mar. 2, 2009, 33 pages.
Office Action issued in U.S. Appl. No. 11/015,424, dated Mar. 19, 2008, 43 pages.
Office Action issued in U.S. Appl. No. 11/015,424, dated May 1, 2009, 47 pages.
Office Action issued in U.S. Appl. No. 11/015,476, dated Mar. 2, 2009, 29 pages.
Office Action issued in U.S. Appl. No. 11/017,204, dated Jun. 23, 2008, 33 pages.
Office Action issued in U.S. Appl. No. 11/017,204, dated Dec. 12, 2007, 13 pages.
Office Action issued in U.S. Appl. No. 11/079,522, dated Apr. 3, 2009, 14 pages.
Office Action issued in U.S. Appl. No. 11/079,522, dated Oct. 16, 2008, 33 pages.
Office Action issued in U.S. Appl. No. 11/237,718, dated Apr. 2, 2009, 53 pages.
Office Action issued in U.S. Appl. No. 11/464,816, dated Apr. 21, 2009, 29 pages.
Supplementary European Search Report issued in European Application No. EP05728303, dated Jan. 9, 2009, 4 pages.
Supplementary European Search Report issued in European Application No. 05857099.5-1238/1836596 PCT/US2005045663, dated Nov. 7, 2008, 5 pages.
Ed Bott and Ron Person, Using Windows 95 with Internet Explorer 4.0, Feb. 17, 1998, Que,Special Edition, 21 pages.
Home-tribe.net, http://washingtondc.tribe.net/message/24434d1b-817b-4580-aa42-3bffa15f26a?page=1 4 total pages.
http://www.friendster.com retrieved on Feb. 24, 2004, 17 pages.
McKendrick, Joseph; "Internet Call Centers: New Era in Customer Service"; Feb. 2002; V10, n2, pp. 22(4).
Neo Mai, Ken Neo. "Buying and selling on the internet; [Computimes, 2* Edition]." New Straits Times. Kuala Lumpur: Jun. 28, 2001. p. 53.
R. Movva & W. Lai, "MSN Messenger Service 1.0 Protocol", Aug. 1999, Internet Draft http://tools.jetf.org/id/draft-movva-msn-messenaer-protocol-•oo.txt, 28 pages.
Reichard, K., "AOL, ICQ to Interoperate—But in a Limited Fashion," Oct. 30, 2002, InstantMessagingPlanet, available at www. instantmessagingplanet.com/public/articie.php/1490771.12 pages.
Ryze home page, www.ryze.com, Dec. 21, 2003, available at http://web.archive.org/web/20031221010006/http://ryze.com, printed Mar. 16, 2005, 13 pages.
VisiblePath webpages, www.visiblepath.org, Dec. 3, 2003, available at http://web.archive.org/web/20031203132211/http://www.visiblepath.com, printed Mar. 16, 2005, 5 pages.
WebmasterWorld.com Inc., "HTML and Browsers", Mar. 5, 2001, Internet: www.webmaster.com/forum21/367.htm, 2 pages.
ZeroDegrees home page, www-zerodegrees.com, Jan. 24, 2004, available at http://web.archive.org/web/20040204153037/www.zerodegrees.com/home.htm, printed Mar. 16, 2005, 2 pages.

(56) References Cited

OTHER PUBLICATIONS

R. Hall, "A Countermeasure to Duplicate-detecting Anti-spam Techniques", AT&T Labs Technical Report 99.9.1, 1999, 7 pages.
A. Kolcz and J. Alspector, "SVM-based Filtering of E-mail Spam with Content-specific Misclassification Costs," *TextDM'200J (IEEE ICDM—2001 Workshop on Text Mining)*, San Jose, CA, 2001, 12 pages.
M. Marvin, "Announce: Implementation of E-mail Spam Proposal", news.adrnin.net-abuse.rnisc, Aug. 3, 1996, 6 pages.
S. Hird, "Technical Solutions for Controlling Spam in the proceedings of Aug. 2002", Melbourne, Sep. 4-6, 2002, 14 pages.
M. Hearst et al., "Support Vector Machines", IEEE Intelligent Systems, Jul./Aug. 1998, 7 pages.
H. Drucker et al., "Support Vector Machines for Spam Categorization", IEEE Transactions on Neural Networks, vol. 10, No. 5, Sep. 1999, 6 pages.
T. Joachirns, Text Categorization with Support Vector Machines: Learning with Many Relevant Features, University of Dortmund, Computer Science Dept., LS-8 Report 23, 1998, 8 pages.
Dudley, "Telstra targets Net spammers", news.com.au, 12/0212003, 2 pages.
Bart Massey et al.; "Learning Spam: Simple Techniques for Freely-Available Software", Computer Science Dept., Portland, OR USA, 2003, pp. 1-14.
"Degrees of Separation Email SpamProtection", http://www.halfbakery.com, pp. 1-3.
Leander Kahney, "Will You Buy a Car From This Man?", Oct. 6, 2003, pp. 1-3.
Joanna Glasner, "Social Nets Find Friends in VCs", http://www.wired.com/news, Nov. 17, 2003, pp. 1-3.
Ion Adroutsopoulos et al., "Learning to Filter Spam E-Mail: A Comparison of a Naive Bayesian and a Memory-Based Approach" University of Athens, pp. 1-12.
Paul Graham, "Better Bayesian Filtering", Jan. 2003, pp. 1-11, http://www.paulgraham.comlbetter.html.
Paul Mutton, "PieSpy Social Network Bot—Inferring and Visualizing Social Networks on IRC", jibble.org, http://listerlinux-srv.anlx.net/piespy, © 2001-2004, pp. 1-18.
"Socialware: Multiagent Systems for Supporting Network Communities," Hattori et al., Mar. 1999, Association for Computing Machinery, Communications of the ACM, vol. 42, Issue 3, pp. 55ff., (6 pages).
Office Action issued in U.S. Appl. No. 10/746,230 dated Oct. 5, 2009, 18 pages.
AOL (R) Instant Messenger (TM), available on Nov. 21, 2002, reprinted from http://web.archive.org/web/20021121031257/http://aim.com on Aug. 31, 2005 (2 pages).
International Search Report from International Application No. PCT/US03/41499, dated Oct. 27, 2004.
Hudson, Greg; Security in the Internet Message and Presence Protocols, http://mirrors.isc.org/pub/www.watersprings.org/pub/id/ draft-hudson-impp-security-00.txt; p. 6, section 7.2.2, first paragraph, p. 6 section 7.2.1, lines 1-2, Nov. 21, 2000.
"File Transfer Preferences", AOL Instant Messenger, version 5.1, Help Documentation, apparently available as of Nov. 21, 2002, 2 pages.
Office Action issued in U.S. Appl. No. 10/746,232, dated Oct. 30, 2009, 20 pages.
Notice of Allowance issued in U.S. Appl. No. 10/746,232, dated Jun. 6, 2010, 20 pages.
Notice of Allowance issued in U.S. Appl. No. 10/746,232, dated Jan. 18, 2011, 18 pages.
Notice of Allowance issued in U.S. Appl. No. 10/746,230, dated Apr. 9, 2010, 16 pages.
Notice of Allowance issued in U.S. Appl. No. 10/746,230, dated Jan. 6, 2011, 15 pages.
Office Action issued in U.S. Appl. No. 13/093,147, dated Jul. 19, 2011, 23 pages.
Notice of Allowance issued in U.S. Appl. No. 13/093,147, dated Jan. 27, 2012, 25 pages.
Office Action issued in U.S. Appl. No. 10/334,142, dated Sep. 7, 2004, 7 pages.
Office Action issued in U.S. Appl. No. 10/334,142, dated May 4, 2005, 10 pages.
Office Action issued in U.S. Appl. No. 10/334,142, dated Dec. 6, 2005, 9 pages.
Office Action issued in U.S. Appl. No. 10/334,142, dated Jul. 14, 2006, 11 pages.
Office Action issued in U.S. Appl. No. 10/334,142, dated Dec. 29, 2006, 9 pages.
Notice of Allowance issued in U.S. Appl. No. 10/334,142, dated Apr. 18, 2007, 14 pages.
Office Action issued in U.S. Appl. No. 11/782,461, dated Jan. 22, 2008, 35 pages.
Office Action issued in U.S. Appl. No. 11/782,461, dated Jul. 17, 2008, 10 pages.
Notice of Allowance issued in U.S. Appl. No. 11/782,461, dated Oct. 7, 2008, 20 pages.
Office Action issued in U.S. Appl. No. 12/349,161, dated Jun. 4, 2010, 19 pages.
Office Action issued in U.S. Appl. No. 12/349,161, dated Oct. 1, 2010, 13 pages.
Notice of Allowance issued in U.S. Appl. No. 12/349,161, dated Jan. 24, 2011, 19 pages.

\* cited by examiner

DEGREES OF SEPARATION FOR HANDLING COMMUNICATIONS

CROSS REFERENCE TO RELATED APPLICATIONS

This application is a continuation of U.S. application Ser. No. 13/093,147, filed on Apr. 25, 2011 now U.S. Pat. No. 8,185,638, which is a continuation of U.S. application Ser. No. 10/746,230, filed on Dec. 29, 2003 (now U.S. Pat. No. 7,945,674), which claims priority to U.S. Provisional Application No. 60/459,272, filed on Apr. 2, 2003. The contents of the above applications are expressly incorporated herein by reference in their entireties.

TECHNICAL FIELD

This description relates to handling communications.

BACKGROUND

With the advent of the Internet and a decline in computer prices, many people are communicating with one another through computers interconnected by networks. A number of different communication mediums have been developed to facilitate such communications. One prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mail). These are akin to junk mail sent through the postal service. However, because spam e-mail requires neither paper nor postage, the costs incurred by the sender of spam e-mail are quite low when compared to the costs incurred by conventional junk mail senders. Due to this and other factors, a significant amount of spam e-mail is sent to e-mail users on a daily basis.

Spam e-mail impacts both e-mail users and e-mail providers. For an e-mail user, spam e-mail can be disruptive, annoying, and time consuming. For an e-mail service provider, spam e-mail represents tangible costs in terms of storage and bandwidth usage. These costs may be substantial when large numbers of spam e-mails are sent.

SUMMARY

In one aspect, techniques for handling a communication from a sender to an intended recipient are described. A communication from a sender directed to an intended recipient is received. The sender and intended recipient of the communication are identified. Whether the sender and the intended recipient are linked by less than a threshold number of degrees of separation is determined. An interface is displayed to the sender prior to displaying the communication to the sender when the sender and the intended recipient are not linked by less than the threshold number of degrees of separation. The interface includes an interface element that allows the intended recipient to indicate that the communication should be displayed.

Implementations may include one or more of the following features. For example, the interface may inform the intended recipient that the sender has sent a communication to the intended recipient. The interface may display to the intended recipient an identifier of the sender. The communication may be displayed when the intended recipient uses the interface element to indicate that the communication should be displayed.

Determining whether the sender and the intended recipient are linked by less than the threshold number of degrees of separation may include determining whether the sender and the intended recipient are linked by at least one intermediary entity. Determining whether the sender is linked to the intended recipient by at least one intermediary entity may include accessing a contact list of the intended recipient to determine at least one contact on the contact list. Determining whether the sender and the intended recipient are linked by at least one intermediary entity may include accessing a contact list of the intended recipient to determine a first contact on the intended recipient's contact list; and accessing a contact list of the first contact to determine a second contact on the first contact's contact list.

Accessing a contact list of the intended recipient may include accessing a contact list that contains communication identifiers related to a different type of communication than the communication from the sender to the intended recipient. Accessing a contact list of the intended recipient may include accessing a contact list that contains communication identifiers related to the type of communication that includes the communication from the sender to the recipient.

The contact list of the intended recipient may include an address book, a buddy list, a personal phone book, or a white list. The communication may be an e-mail message, an instant message, an SMS message, or a telephone call.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In general, the degree of separation between a sender and an intended recipient is used to inform filtering of a communication sent from the sender to the intended recipient. The degree of separation between two entities describes a relationship between those entities. Typically, user contact lists (e.g., address book, buddy list, and/or white list) are evaluated to determine the number of degrees (or hops) that are required to link or relate two users.

For example, recipient A may list user B in recipient A's address book, user B may list user C in user B's address book, and user C may list sender D in user C's address book. Here, sender D is linked to recipient A by two degrees of separation (with user B as the first degree and user C as the second degree). Recipient A is related to user C by one degree of separation (user B) and user B is separated from user D by one degree of separation (user C). Recipient A and user B, users B and C, and user C and sender D are each respectively separated by zero degrees of separation.

The conceitedness or lack of conceitedness is used, possibly along with the degrees of separation, to aid the handling of communications sent to the recipient by the sender. For instance, handling may be informed based on: (1) whether a sender and a recipient are connected (i.e., the sender and the recipient are known to each other or the sender is known to the recipient); and (2) if they are connected, the number of degrees, hops or intermediaries required to link or relate the sender to the recipient.

The following description more fully describes these techniques as applied to e-mail spam filtering. However, the techniques may be applied to other communication media and to other filtering applications.

Figure 1:
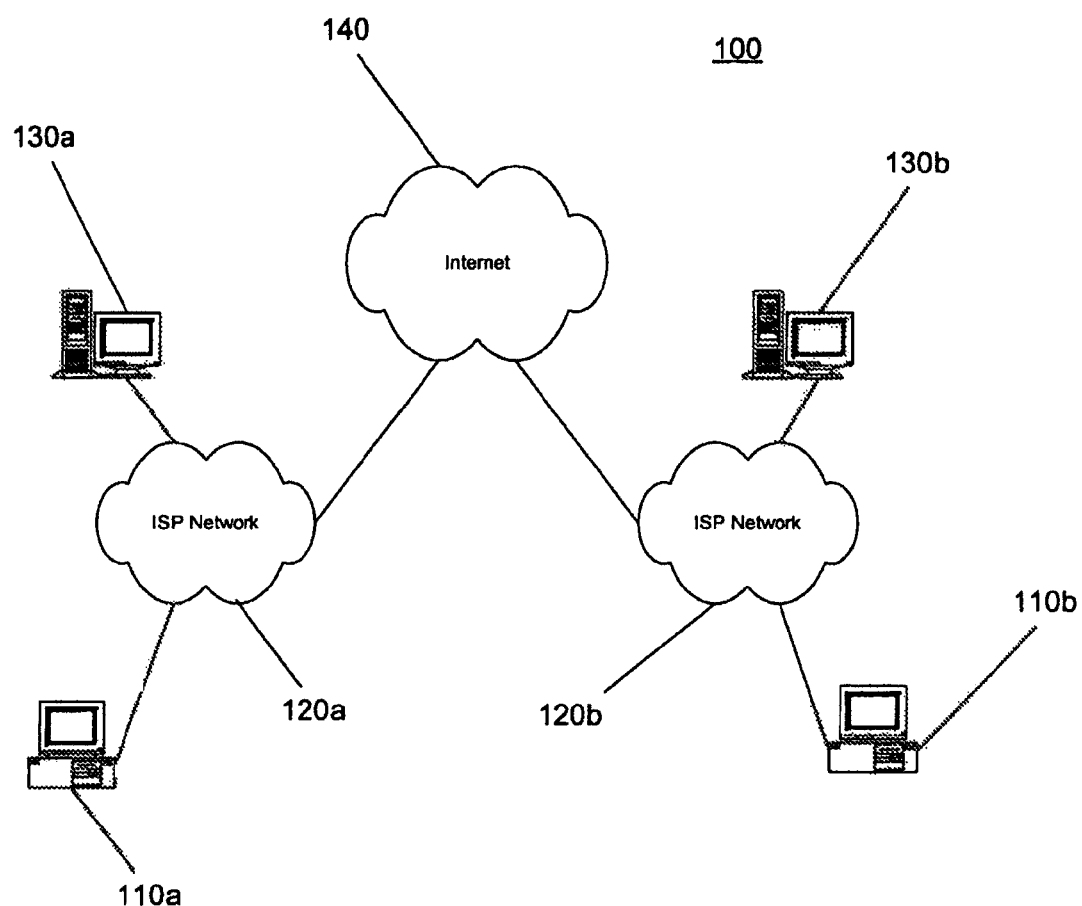
FIG. 1 is a diagram showing an exemplary networked computing environment that supports e-mail communications and in which spam filtering may be performed.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to Internet service provider (ISP) networks 120a and 120b, respectively. Clients 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail servers 130a and 130b also are connected to ISP networks 120a and 120b, respectively. ISP networks 120a and 120b are connected to a global network 140 (e.g., the Internet) such that a device on one ISP network 120a or 120b can communicate with a device on the other ISP network 120a or 120b. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and the e-mail servers 130a and 130b may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Networks 120a and 120b may include multiple networks or sub-networks, each of which may include, for example, a wired or wireless data pathway.

Each of e-mail servers 130a and 130b may handle e-mail for thousands or more e-mail users connected to an ISP network 120a or 120b. Each e-mail server may handle e-mail for a single e-mail domain (e.g., aol.com) or for multiple e-mail domains. In addition, each e-mail server may be composed of multiple, interconnected computers working together to provide e-mail service for e-mail users of the corresponding ISP network.

An e-mail user, such as a user of client system 110a or 110b, typically has one or more e-mail accounts on an e-mail server 130a or 130b. Each account corresponds to an e-mail address. Each account (otherwise referred to as a user mailbox) may have one or more folders in which e-mail is stored. E-mail sent to one of the e-mail user's e-mail addresses is routed to the corresponding e-mail server 130a or 130b and placed in the account that corresponds to the e-mail address to which the e-mail was sent. The e-mail user then uses, for example, an e-mail client program executing on client system 110a or 110b to retrieve the e-mail from e-mail server 130a or 130b and view the e-mail. The e-mail client program may be, for example, a web browser (in the case of HTML mail), a stand-alone e-mail program, or an e-mail program that is part of an integrated suite of applications.

The e-mail client programs executing on client systems 110a and 110b also may allow one of the users to send e-mail to an e-mail address. For example, the e-mail client program executing on client system 110a may allow the e-mail user of client system 110a (the sender) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places the e-mail in the account that corresponds to the recipient address. The user of client system 110b may then retrieve the e-mail from e-mail server 130b, as described above.

To aid a user in sending e-mails, many e-mail client programs or other programs allow a user to maintain an address book. An address book is a list of the user's contacts along with their contact information. An address book may contain a contact's e-mail address, instant messaging screenname, street address, and/or telephone number(s). The address book may be stored on the client system or on a server, and may be accessed by the client program.

Figure 2:
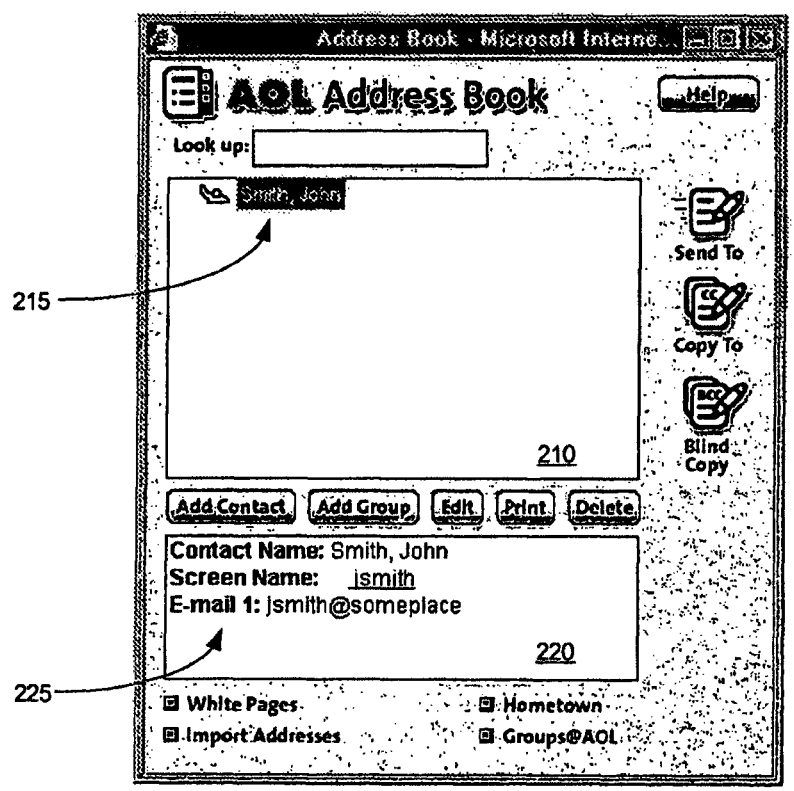
FIG. 2 is an illustration showing an exemplary address book that may be displayed to a user of an e-mail client program.

FIG. 2 illustrates an exemplary address book 200 that may be displayed to a user of an e-mail client program. Address book 200 includes a list box 210 that contains a list 215 of the user's contacts. Only a single contact, John Smith, is shown in contact list 215, though a contact list may contain multiple entries. When a contact in contact list 215 is selected, the contact's information 225 is shown in a box 220. The information contains, for example, the contact's name, the contact's screenname, and the contact's e-mail address.

In an e-mail environment such as that shown in FIG. 1, a spammer typically uses an e-mail client program to send similar spam e-mails to hundreds, if not thousands, of e-mail recipients. For example, a spammer may target hundreds of recipient e-mail addresses serviced by e-mail server 130b on ISP network 120b, and may maintain the list of targeted recipient addresses as a distribution list. The spammer may use the e-mail client program to compose a spam e-mail and may instruct the e-mail client program to use the distribution list to send the spam e-mail to the recipient addresses. The e-mail then is sent to e-mail server 130b for delivery to the recipient addresses.

Filtering traditionally has been used to eliminate or at least reduce some spam e-mail. Filtering may be done on the server-side, e.g. at e-mail server 130b, or on the client-side, e.g. at client 110b. Thus, a spam filter may be located on the server or the client. Wherever located, the spam filter may analyze e-mail coming into the server or client to determine whether any of the e-mail is spam. Once the filter designates a piece of e-mail as spam, the e-mail is treated accordingly. For example, the spam e-mail may be deleted or placed in a specific spam folder.

A spam filter may be implemented using a number of techniques. One technique that has been used is simple text filtering, in which an e-mail's headers and/or the e-mail body is searched for simple text strings or regular expressions and the e-mail is classified as spam based on whether the string or expression is present. Other techniques analyze word or other features of an e-mail to develop a rating or probability measure of the likelihood that the e-mail is spam, and then compare the rating or measure to a classification threshold. If the rating or measure exceeds the threshold, the e-mail is designated as spam. The techniques used to develop the ratings may be, for example, heuristic or Bayesian based.

The spam filter also may employ so-called white lists and/or black lists. A black list is a list of e-mail domains, specific e-mail addresses, or IP addresses that are considered to be a source of spam. Any e-mail received from a blacklisted domain, e-mail address or IP address is designated by the filter as spam.

A white list typically is used to help ensure that legitimate e-mail is delivered to the recipient. Similar to a black list, a white list is a list of e-mail domains, specific e-mail addresses, or IP addresses. The items on a white list, however, generally are considered to be sources of legitimate e-mail. Consequently, any e-mail received from a source on the white list is designated as legitimate e-mail (i.e., non-spam) and exempted from further filtering.

Figure 3:
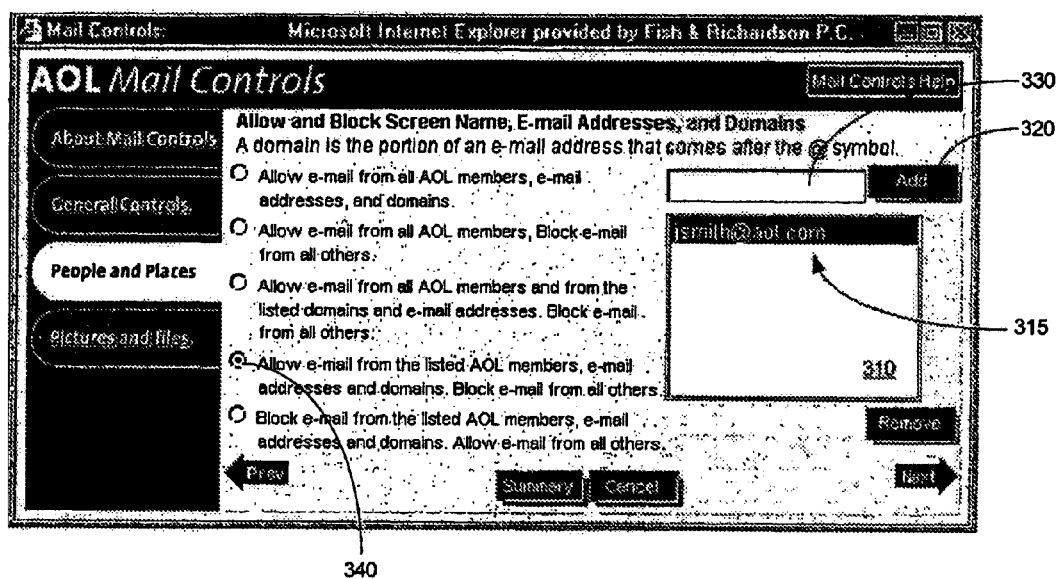
FIG. 3 is an illustration showing an interface that allows an e-mail client program user to add contacts to a white list.

FIG. 3 illustrates an interface 300 that allows an e-mail client program user to add contacts to a white list. Interface 300 includes a list box 310 that contains a list of contacts 315. Interface 300 also includes an edit box 320 and "Add" button 330 for adding additional contacts to list 315. A radio button 340 is included in interface 300 to allow the user to designate list 315 as a white list (i.e. to allow e-mail from the listed contacts to be delivered without being subjected to spam filtering).

An e-mail sender's degree of separation from a mail recipient also may be used to aid in spam filtering. The "degree of separation" represents a metric used to quantify whether/how the recipient is linked to the sender through intermediary people or other entities. For example, a recipient may know a first user (first degree of separation) and the first user may know a second user (second degree of separation) who knows the sender of an e-mail. In this case, the sender is separated from the recipient by two degrees of separation (i.e., by two intermediate contacts). A level of "trust" or "legitimacy" about a sender's communication can be inferred by looking at whether the sender is linked to a recipient through the recipient's contacts, the recipient's contacts' contacts, or otherwise, with the level of trust typically diminishing as the number of degrees of separation increases. For instance, a system or user may consider a communication based on more degrees of separation between the sender and recipient as less likely to be legitimate or trusted than one with fewer degrees of separation.

A trusted list of contacts linked to a user/recipient may be developed for use with a spam filter when filtering. The trusted list may be developed, for example, by evaluating a contact list for the intended recipient that lists the intended recipient's contacts as more fully described below. The contact list may contain communication identifiers related to the type of communication that is received (e.g., a buddy list may be accessed when the type of communication is an instant message, while an address book may be referenced when the type of communication being filtered is an e-mail communication or telephone call), or the contact list may contain communication identifiers related to a different type of communication than the one that is sent (e.g., a buddy list may be accessed when the communication is an e-mail), or a combination of similar and different types of contact lists may be accessed. Further, a single contact list may have both communication identifiers related to the type of communication received and communication identifiers related to a different type of communication than the one received. Whether a contact is linked to an intended recipient may be based on communication identifiers related to the type of communication received or may be based on communication identifiers related to a different type of communication than the one received.

Thus, for example, a contact may be determined as linked to an intended recipient based on an IM screen names. This contact, however, may be placed in a trusted list that is used for e-mail communications. In other words, a contact may be determined to be linked to the intended recipient based on one type of communication, and this link is used for other types of communications. The link based on IM screen names may be determined, for instance, by accessing a buddy list of the intended recipient or by accessing a central contact list that contains e-mail addresses and IM screen names.

The trusted list may simply contain a communication identifier (e.g., e-mail address or screenname) for the linked contacts, or the trusted list also may contain the degrees of separation between the user and the linked contacts, depending on how the trusted list is used to facilitate spam filtering. The trusted list also may contain other information about a linked contact. The following is an example of a trusted list that contains a communication identifier and the degrees of separation for each linked contact:

| Trusted List | |
| --- | --- |
| Screennames | Degrees of Separation |
| randomcontact | 2 |
| Jsmith | 3 |
| internetann | 1 |
| chattinchuck | 4 |

Depending on the spam filtering techniques employed by the spam filter, the trusted list may be used simply as a white list to exempt from spam filtering those e-mails from the linked contacts. Similarly, the trusted list may be used simply as a white list to allow only communications from those entities on the white list to be delivered to the intended recipient, with all other communications being prevented from reaching the intended recipient.

Alternatively, the presence or absence of a sender on the trusted list (and possibly the sender's degrees of separation) may be considered a feature of an e-mail when determining whether the e-mail is spam. For example, for a spam filter that heuristically develops a rating of the likelihood that an e-mail is spam, the presence in the trusted list may decrease the rating, with lower degrees of separation decreasing the rating more than higher degrees of separation. For a Bayesian spam filter, the presence or absence on the trusted list, along with the degrees of separation, may be considered a feature for both training and classification. The degrees of separation may be used with other features of the e-mail to determine a spam rating. The other features may include, for example, origin IP address, origin domain, mime-types contained in the e-mail, sender's address, and specific words in the body of the e-mail.

Alternatively, or additionally, e-mail may be treated differently based on the sender's degrees of separation. For example, e-mail whose sender is within 1 to M degrees of separation may be exempted from filtering, e-mail whose sender is within M+1 to M+X degrees of separation may be treated as unknown and consequently filtered, and e-mail whose sender is not linked or is linked by a degree of separation greater than M+X may be automatically discarded as spam. Other ways of treating the e-mail are possible, as are other ways of dividing up the relevant degrees of separation.

Figure 4:
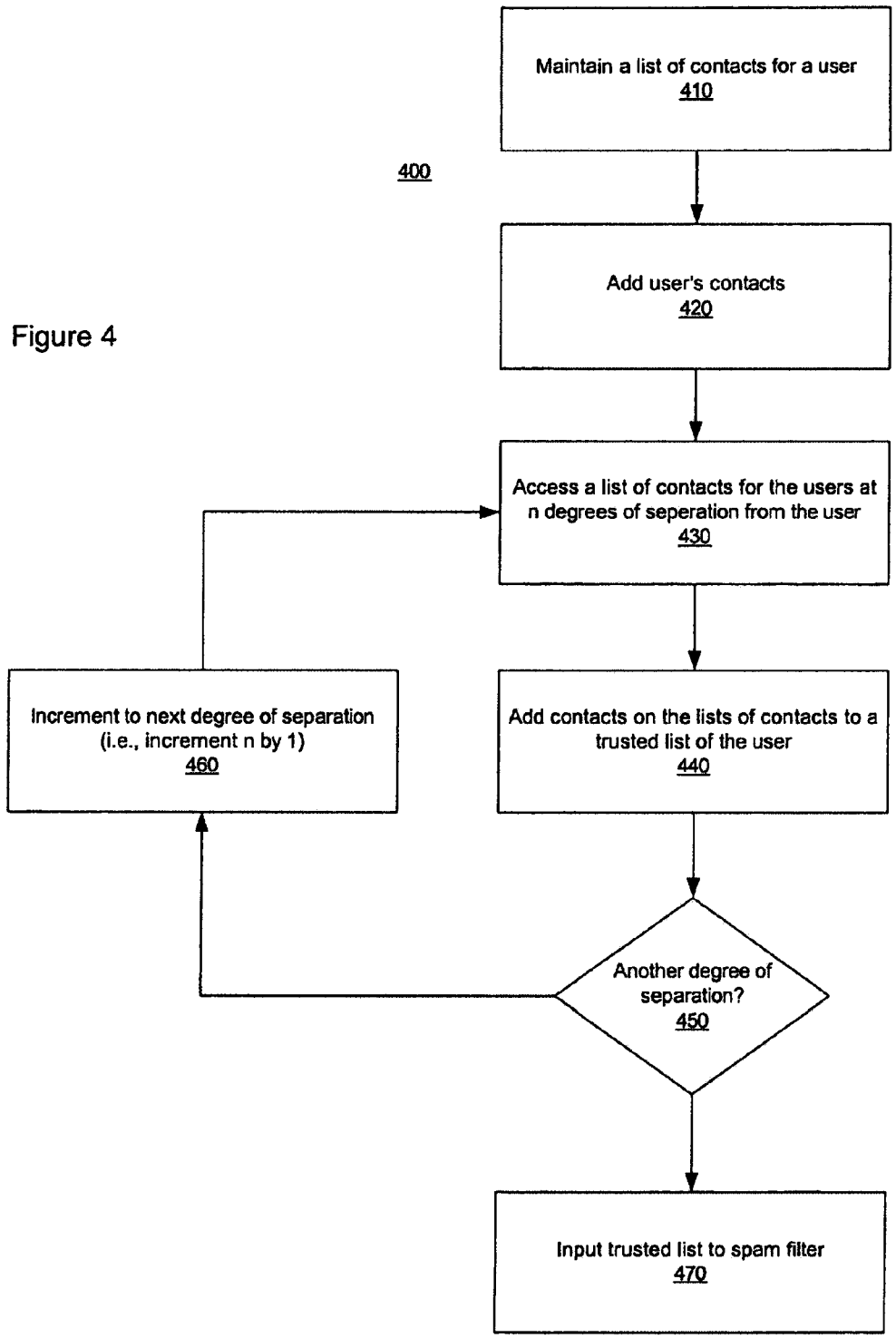
FIG. 4 is a flow chart of a process for using an e-mail sender's degrees of separation from a mail recipient to aid in spam filtering.

FIG. 4 is a flow chart of a process 400 for using an e-mail sender's degrees of separation from a mail recipient to aid in spam filtering. A list of contacts is maintained for the recipient (410). The list of contacts may be any personally maintained list, for example, an address book, a buddy list for instant messaging, and/or a white list. The rest of process 400 will be described using an address book as an example of a list of contacts.

The contacts in the recipient's address book are added to a trusted list of the recipient (420). If the trusted list contains, for example, e-mail addresses, but the contact list only contains screennames, then the contacts' e-mail addresses may be looked-up using, for example, a database that correlates information such as a user's e-mail address and IM screennames.

Next, the contacts linked to the recipient (i.e., up to a desired degree of separation) are identified and added to the trusted list. To do so, the address books of each contact in the recipient's address book are accessed (430). The contacts in the recipient's contacts' address books (i.e., the contacts separated by one degree) then are added to the trusted list (440). If another degree of separation is desired (450), the degree of separation is incremented (460) such that the address books of the contacts that are separated from the recipient by one degree are accessed (430) and the contacts in those address books are added to the trusted list (440). When a contact is added to the trusted list, the contact's degree of separation from the recipient also may be added. The addition of contacts continues until the desired degree of separation is reached (450). Once the desired degree of separation has been reached, the trusted list is input to the spam filter for use in filtering spam (470).

Process 400 may be performed before an e-mail is received and the trusted list may be stored for use with the spam filter. Alternatively, process 400 may be performed whenever an e-mail is received.

Process 400 may result in the trusted list not being updated when any users related to the intended recipient update their contact lists. That is, if a user related to the intended recipient adds a contact to the user's contact list, the new contact may not be reflected in the intended recipient's trusted list. This situation may not be overly detrimental, particularly in implementations where the trusted list is used as a white list to exempt certain e-mails from spam filtering. However, repeating process 400 on a periodic or aperiodic basis may mitigate this situation. Another manner of mitigating this situation is to use an update system in which changes to contact lists are tracked and trusted lists are updated accordingly in an incremental fashion or by triggering an update or re-initiation of process 400 when an update occurs. The alternate process 500 illustrated in FIG. 5 also may mitigate such a situation.

Figure 5:
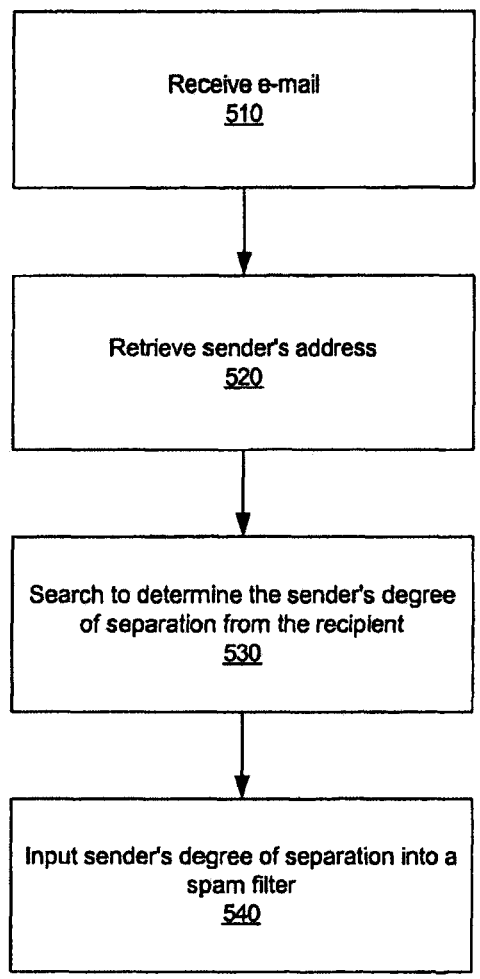
FIG. 5 is a flow chart of an alternate process for using a sender's degrees of separation from a mail recipient to aid in spam filtering.

FIG. 5 is a flow chart of an alternate process 500 for using a sender's degrees of separation from a mail recipient to aid in spam filtering. When an e-mail is received (510), the sender's address is retrieved from the e-mail (520). A search then is performed to determine the sender's degree of separation from the recipient (530). In one implementation, to perform the search, the contacts in the recipient's address book (i.e., the contacts separated by zero degrees) are searched to determine if the sender is among those contacts. If not, then the address books of one or more contacts in the recipient's address book are accessed and searched to determine if the sender is among those contacts. If the sender is not among those contacts, and another degree of separation is desired, the degree of separation is incremented such that the address books of the contacts that are separated from the recipient by one degree are accessed and searched to determine if the sender is among those contacts. This continues until the desired degree of separation has been reached. At that point, if the sender has not been located, then the sender is not considered to be linked to the recipient. An indication of whether the sender is linked to the intended recipient, and possibly also the sender's degree of separation from the intended recipient, are input to a spam filter for use in determining whether the e-mail is spam (540).

Process 400 or process 500 may be implemented by the server, by the client, or by a combination of both.

The contact lists of the users may be stored centrally or in a distributed fashion. For example, the techniques may be applied to an environment in which all of the users' contact lists are stored on a single server (completely centralized), or on a single cluster of servers owned by the same e-mail service provider (partially centralized/distributed).

The contact lists may be stored in a more fully distributed fashion by being stored on different servers owned by different e-mail service providers (which may or may not adopt a standardized protocol for sharing information such as contact lists), or by being stored on each client system (i.e., each user's contact list is stored on the user's client system). If the contact lists are stored on the client (e.g., a client running Microsoft Outlook), the accessing and searching of the contacts' address books or other contact lists may be performed using peer-to-peer techniques. When contact lists are stored on the clients, privacy and security measures may be implemented, such as hashing the trusted list or otherwise making it unreadable to the user, so that the user can not determine who is listed in his or her contacts' lists or otherwise have access to someone's contact information that has not been specifically given to the user. For example, if a recipient has only one contact in his or her contact list and only one degree of separation is used, then the recipient may be able to discern who that single contact has on his or her contact list. Making the trusted list unreadable to its "owner" may eliminate this potential issue.

In a distributed environment in which different contact lists are maintained on servers of different providers, a trusted group model may be implemented to allow access to the different contact lists, as needed, to develop the degrees of separation between a recipient and a sender. For example, if the user of client system 110*b* has an account on e-mail server 130*b* and the user's address book is maintained on server 130*b*, the user's address book (or the user's contacts' address books) may include contacts with address books maintained on a server owned by a different provider, such as, for example, server 130*a*. Generally, the provider of server 130*a* would not allow outside parties to access the contact lists of its users. To implement the foregoing techniques, however, a trusted group model may be developed that allows server 130*b* to access the address books or other contact lists of the users whose accounts are maintained on server 130*a*. In this way, server 130*b* may be able to determine the linked contacts, even if some of the contact lists are on server 130*a*. Thus, for instance, e-mail service providers such as America Online (AOL) and Hotmail may cooperate to allow access to users' contact lists so as to increase the effectiveness of the foregoing techniques. Also, for example, two corporations, each running an e-mail server (e.g., a Microsoft Exchange server), a corporation and an ISP, or any two e-mail service providers may cooperate to allow access to users' contact lists.

Regardless of whether a client-side or server-side implementation is used, for some implementations the foregoing techniques may be limited out of privacy or security concerns similar to those described above with regard to storing the contact lists at the client. For example, if a recipient has only one contact in his or her contact list and only one degree of separation is used, then the recipient may be able to discern who that single contact has on his or her contact list if restrictions are not applied.

The use of the foregoing techniques may be limited such that the techniques are not performed when the number of contacts in a recipient's contact list is below a predetermined number. Also, there may be a requirement that a minimum number of degrees of separation are searched. Other limitations may include limiting a user's ability to perceive his or her trusted list. Preventing the user's ability to perceive or access the trusted list may be accomplished by preventing the display of the trusted list, storing the trusted list remote from the user, or, as described above, storing the trusted list as a hash.

The foregoing techniques also may be limited such that a contact list is not used when the contact list does not contain the recipient. In other words, the contact lists of users who do not include the recipient are not used to determine contacts at the next level of separation. For example, if user A is a mail recipient, a user B that is in user A's address book may be indicated as a linked user. When user B's address book contains user A, user B's address book is used for the next degree of separation, which results in a user C (who is in user B's address book) as being linked to user A. However, because user C's address book does not contain user A, user C's address book is not used when a search is done for the next degree of separation.

The techniques are described as being applied to e-mail spam filtering. However, the techniques may be used for spam filtering of communications in other communication media, including both text and non-text media. For example, the techniques may be applied to instant messaging. In such an environment, an instant messaging buddy list or an address book may be used as the contact list, and the trusted list may contain the screennames of linked contacts. The trusted list may be input into a spam filter that prevents spam instant messages. Another example of an environment in which the foregoing techniques may be implemented is short messaging service (SMS) communications used in cell phones. In this case, a phone book for the cell phone may be used as the contact list. As another example, these techniques may be used to filter telephone calls based on a user's contact list, such as a personal phone book or an address book, particularly if the telephone calls are carried over packet networks such as the Internet.

The above techniques also may be extended to apply to the general handling, classification, or filtering of communications. For example, a recipient may want messages from senders who are linked to the recipient to be classified as important, while other messages are classified as low priority. Similarly, a Bayesian classifier may be used to classify received e-mail into classes other than spam. The Bayesian classifier may be trained with a set of e-mail that includes information about whether a sender of the e-mail is linked to the recipient and, if so, by how many degrees. The Bayesian classifier then may use the information when classifying an unknown e-mail.

As another example of general handling of communications, the handling in an instant messaging implementation (or other implementations) may include bypassing or invoking a "knock-knock" interface. At times, when a sender sends an intended recipient an instant message, instead of receiving the instant message right away, the intended recipient's instant messaging program invokes a "knock-knock" interface. The interface typically informs the intended recipient that the sender is trying to instant message him or her, identifies the sender (e.g., by displaying the screen name of the sender), and provides the intended recipient with an option of accepting the message. If the intended recipient indicates that he or she wishes to accept the instant message, it is delivered to the intended recipient and displayed to the intended recipient. On the other hand, if the intended recipient indicates he or she would not like to receive the message, the message is not provided to the intended recipient and, for example, may be discarded. In some implementations, the sender also is placed on a block list when the intended recipient indicates he or she does not want to receive an instant message from the sender. The block list is used to prevent further instant message communications from users on the block list without bothering the intended recipient, i.e., instant messages from users on the block list are automatically ignored without asking the intended recipient whether he or she wants to receive them.

The trusted list may be used to determine when to invoke a knock-knock interface. To do so, whether a knock-knock interface is invoked may depend on the number of degrees of separation between the sender and the intended recipient. In one implementation, instant messages from senders less than or equal to n degrees away from the intended recipient are provided to the intended recipient automatically without a knock-knock interface being invoked, while a knock-knock interface is invoked for instant messages from senders greater than n degrees away from the intended recipient. Alternatively, instant messages from senders within 1 to M degrees may be provided to the intended recipient without a knock-knock interface being invoked, instant messages from senders within M+1 to N degrees may cause a knock-knock to be invoked, while instant messages from senders greater than N degrees away may be automatically discarded without invoking a knock-knock interface or otherwise informing the intended recipient.

The above techniques have been described as creating a "trusted" list. However, these techniques could be used to source a "non-trusted" list by adding the black lists (or other lists denoting untrusted senders) of linked contacts to a non-trusted list for the intended recipient, at least up to a threshold degree of separation. The non-trusted list may then, for example, be used as a black list, or may be a factor for spam filtering.

Creating such a non-trusted list may be used in conjunction with developing the trusted list. For example, for each or a subset of the contacts added to the trusted list, the entities on the added contacts' black lists (or other lists denoting untrusted senders) can be placed on the intended recipient's non-trusted list. As another example, when a contact's contact list is accessed and added to the trusted list, the contact's list of untrusted senders also may be accessed and added to the non-trusted list.

Figure 6:
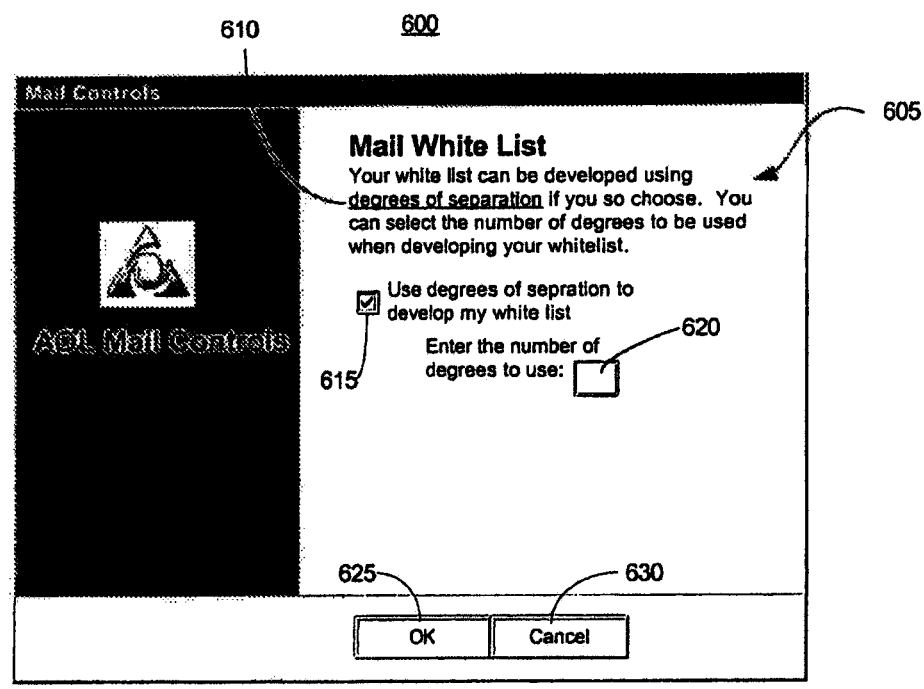
FIG. 6 is an illustration showing an exemplary interface that may be used to allow a user to adjust preferences with regard to the degrees of separation feature.

FIG. 6 illustrates an exemplary interface 600 that may be used to allow a user to adjust preferences with regard to the degrees of separation feature. Some implementations may provide a user the ability to decide whether degrees of separation will be used, and, if so, how many degrees should be used. Exemplary interface 600 includes a text 605 that explains to the user that the user may decide to have his or her white list populated using degrees of separation and that the user may select how many degrees to use. Text 605 includes a hyperlinked portion 610 that, when selected by the user, invokes an interface (not shown) that provides information about degrees of separation.

Interface 600 also has a check box 615 that allows a user to select whether degrees of separation should be used to develop his or her white list. When check box 615 is not checked, degrees of separation will not be used. When check box 615 is checked, degrees of separation will be used.

Interface 600 additionally has an edit box 620 that allows a user to select how many degrees will be used to develop the white list. When check box 615 is not checked, edit box 620 becomes inactive and is grayed out. When check box 615 is checked, however, edit box 620 becomes active and the user is able to enter the number of degrees to be used.

An OK button 625 is available on interface 600 to allow the user to indicate that the preferences selected in interface 600 should be saved. A Cancel button 630 cancels the preferences without saving them.

Other implementations may provide varying levels of user control. For instance, the user may be able to select whether white lists (or other trusted lists) are used, but without any control over whether degrees of separation are used. That is, the system may automatically use degrees of separation when the user chooses to use white lists or other trusted lists. Alternatively, for example, a system may use the white lists or other trusted lists and degrees of separation without providing the user control over either.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. Accordingly, other implementations are within the scope of the following claims.

What is claimed is:

1. A computer-implemented method comprising:
receiving a communication from a sender, wherein the communication is directed to an intended recipient;
accessing a contact list associated with the intended recipient, the contact list of the intended recipient identifying at least one user identifier;
accessing a contact list associated with the at least one user identifier;
determining, based on the contact list of the intended recipient and the contact list of the at least one user identifier, whether the sender and the intended recipient are linked by less than a threshold number of degrees of separation; and
determining, using at least one processor, whether the communication is a spam communication based on whether the sender and the intended recipient are linked by less than the threshold number of degrees of separation.

2. The method of claim 1, further comprising:
displaying an interface to the intended recipient, prior to displaying the communication to the intended recipient, when the sender and the intended recipient are not linked by less than the threshold number of degrees of separation.

3. The method of claim 2, wherein the interface informs the intended recipient that the sender has sent a communication to the intended recipient.

4. The method of claim 2, wherein the interface comprises an interface element that allows the intended recipient to indicate that the communication should be displayed.

5. The method of claim 1, wherein determining whether the sender and the intended recipient are linked by less than the threshold number of degrees of separation includes determining whether the sender and the intended recipient are linked by at least one intermediary entity.

6. The method of claim 1, further comprising:
displaying the communication to the intended recipient when the sender and the intended recipient are linked by less than the threshold number of degrees of separation.

7. The method of claim 1, wherein the contact list of the intended recipient comprises at least one of an address book, a buddy list, a personal phone book, or a white list.

8. The method of claim 1, wherein the communication is one of an email message, an instant message, an SMS message, or a telephone call.

9. The method of claim 1, further comprising:
displaying the communication to the intended recipient when the threshold number of degrees of separation corresponds to a value of at least one and when the contact list of the user identifier includes an identifier of the sender.

10. The method of claim 1, further comprising:
displaying an interface to the intended recipient, prior to displaying the communication to the intended recipient, when the threshold number of degrees of separation corresponds to a value of at least two and when an identifier of the sender is not included in the contact list of the intended recipient and the contact list of the user identifier.

11. A non-transitory computer-readable storage medium storing programmable instructions, which when executed by at least one processor, causes the processor to perform a method comprising:

receiving a communication from a sender, wherein the communication is directed to an intended recipient;

accessing a contact list associated with the intended recipient, the contact list of the intended recipient identifying at least one user identifier;

accessing a contact list associated with the at least one user identifier;

determining, based on the contact list of the intended recipient and the contact list of the at least one user identifier, whether the sender and the intended recipient are linked by less than a threshold number of degrees of separation; and determining, using at least one processor, whether the communication is a spam communication based on whether the sender and the intended recipient are linked by less than the threshold number of degrees of separation.

12. The non-transitory computer-readable storage medium of claim 11, wherein the programmable instructions further cause the at least one processor to perform the following step:

displaying an interface to the intended recipient, prior to displaying the communication to the intended recipient, when the sender and the intended recipient are not linked by less than the threshold number of degrees of separation.

13. The non-transitory computer-readable storage medium of claim 12, wherein the interface is displayed to the intended recipient when the threshold number of degrees of separation corresponds to a value of at least two and when an identifier of the sender is not included in the contact list of the intended recipient and the contact list of the user identifier.

14. The non-transitory computer-readable storage medium of claim 13, wherein the interface comprises an interface element that allows the intended recipient to indicate that the communication should be displayed.

15. The non-transitory computer-readable storage medium of claim 11, wherein the programmable instructions further cause the at least one processor to perform the following step:

displaying the communication to the intended recipient when the sender and the intended recipient are linked by less than the threshold number of degrees of separation.

16. The non-transitory computer-readable storage medium of claim 11, wherein the contact list of the intended recipient comprises at least one of an address book, a buddy list, a personal phone book, or a white list.

17. The non-transitory computer-readable storage medium of claim 11, wherein the communication is one of an e-mail message, an instant message, an SMS message, or a telephone call.

18. An apparatus comprising:
a memory device storing instructions;
at least one processor executing the instructions to:
receive a communication from a sender, wherein the communication is directed to an intended recipient;
access a contact list associated with the intended recipient, the contact list of the intended recipient identifying at least one user identifier;
access a contact list associated with the at least one user identifier;
determine, based on the contact list of the intended recipient and the contact list of the at least one user identifier, whether the sender and the intended recipient are linked by less than a threshold number of degrees of separation; and
determine whether the communication is a spam communication based on whether the sender and the intended recipient are linked by less than the threshold number of degrees of separation.

19. The apparatus of claim 18, wherein the communication is displayed to the intended recipient when the threshold number of degrees of separation corresponds to a value of at least one and when the contact list of the user identifier includes an identifier of the sender.

20. The apparatus of claim 18, wherein the at least one processor is further adapted to:

display an interface to the intended recipient, prior to displaying the communication to the intended recipient, when the sender and the intended recipient are not linked by less than the threshold number of degrees of separation.

* * * * *